US012768453B2

(12) United States Patent
Bradley

(10) Patent No.: US 12,768,453 B2
(45) Date of Patent: Oct. 20, 2026

(54) INTEGRAL SEAT FOR VALVE

(71) Applicant: Mueller International, LLC, Atlanta, GA (US)

(72) Inventor: Jason White Bradley, Soddy Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/608,611

(22) Filed: Mar. 18, 2024

(65) Prior Publication Data

US 2025/0290567 A1 Sep. 18, 2025

(51) Int. Cl.

| | |
|---|---|
| ***F16K 1/42*** | (2006.01) |
| ***B33Y 40/10*** | (2020.01) |
| ***B33Y 40/20*** | (2020.01) |
| ***B33Y 80/00*** | (2015.01) |
| ***F16K 1/22*** | (2006.01) |
| ***F16K 27/02*** | (2006.01) |

(52) U.S. Cl.

CPC ................ *F16K 1/42* (2013.01); *B33Y 40/10* (2020.01); *B33Y 40/20* (2020.01); *B33Y 80/00* (2014.12); *F16K 1/22* (2013.01); *F16K 27/0218* (2013.01)

(58) Field of Classification Search

CPC ... E02B 7/26; E02B 7/20–54; B23K 11/0013; B23K 10/027; B23K 26/342

See application file for complete search history.

(56) References Cited

U.S. PATENT DOCUMENTS

| | | | | |
|---|---|---|---|---|
| 786,043 A * | 3/1905 | Luckett | F16K 29/00 251/327 |
| 983,297 A * | 2/1911 | Leopold | F16K 3/184 251/204 |
| 1,704,955 A | 3/1929 | Snow | |
| 1,732,241 A | 10/1929 | Murray, Jr. | |
| 4,028,896 A | 6/1977 | Whipps | |
| 4,070,863 A | 1/1978 | Brown | |
| 5,947,443 A * | 9/1999 | Shellenbarger | F16K 5/0478 251/181 |
| 10,378,656 B2 | 8/2019 | Abouelleil | |
| 10,808,850 B2 | 10/2020 | Abouelleil et al. | |
| 10,866,576 B2 * | 12/2020 | Jacobs, II | B33Y 40/20 |
| 11,007,704 B2 * | 5/2021 | Lowinger | F16J 1/00 |
| 11,994,228 B2 | 5/2024 | Bradley | |
| 12,578,023 B2 | 3/2026 | Bradley | |

(Continued)

OTHER PUBLICATIONS

Bradley, Jason White; Non-Final Office Action for U.S. Appl. No. 17/588,962, filed Jan. 31, 2022, mailed Oct. 18, 2023, 12 pgs.

(Continued)

*Primary Examiner* — Jacob J Cigna

(74) *Attorney, Agent, or Firm* — Smith, Gambrell & Russell LLP

(57) ABSTRACT

A valve body assembly includes a valve body defining a first end, a second end opposite the first end, and an inner body surface, the inner body surface defining a main valve bore extending from the first end to the second end; and an integral valve seat integrally attached to the inner body surface within the main valve bore, the integral valve seat comprising an additive material additively deposited on the inner body surface, the integral valve seat defining a seating surface configured to confront and seal with a valve member.

7 Claims, 9 Drawing Sheets

(56) References Cited

U.S. PATENT DOCUMENTS

| | | | | |
|---|---|---|---|---|
| 2004/0107019 | A1* | 6/2004 | Keshavmurthy .. | G05B 19/4097<br>700/118 |
| 2018/0216738 | A1* | 8/2018 | Gabriel ................. | F16K 25/005 |
| 2018/0236555 | A1 | 8/2018 | Weinenger | |
| 2018/0272472 | A1* | 9/2018 | Aoyama ................ | F02M 61/18 |
| 2023/0091259 | A1* | 3/2023 | Marya ..................... | B22F 10/18<br>251/359 |
| 2023/0243431 | A1 | 8/2023 | Bradley | |
| 2024/0271707 | A1 | 8/2024 | Bradley | |
| 2024/0271708 | A1 | 8/2024 | Bradley | |

OTHER PUBLICATIONS

Bradley, Jason White; Notice of Allowance for U.S. Appl. No. 17/588,962, filed Jan. 31, 2022, mailed Jan. 24, 2024, 7 pgs.
Bradley, Jason White; Requirement for Restriction/Election for U.S. Appl. No. 17/588,962, filed Jan. 31, 2022, mailed Sep. 7, 2023, 7 pgs.
Mueller; Brochure for Heavy Duty HG560—Cast Iron Slide Gate, publicly available prior to Jan. 31, 2022, 28 pgs.
Bradley, Jason White; Non-Final Office Action for U.S. Appl. No. 18/643,680, filed Apr. 23, 2024, mailed May 20, 2025, 25 pgs.
Anonymous. Seminar Report: Anatomy of a Sluice Gate. Rodneyhunt.com [online], Mar. 2006 [retrieved on Mar. 23 2026]. Retrieved from the Internet :<URL: https://web.archive.org/web/20060320073952/http://www.rodneyhunt.com/Anatomy_sluicegate.pdf> (Year: 2006), 13 pgs.
Alanerickson. 4" slide gate valve. Thingiverse.com [online], Apr. 2017 [retrieved Mar. 23, 2026]. Retrieved from the internet. <URL: https://www.thingiverse.com/thing:2237898> (Year: 2017), 12 pgs.
Bradley, Jason White; Non-Final Office Action for U.S. Appl. No. 18/643,652, filed Apr. 23, 2024, mailed Mar. 27, 2026, 49 pgs.

* cited by examiner

INTEGRAL SEAT FOR VALVE

TECHNICAL FIELD

This disclosure relates to valves. More specifically, this disclosure relates to a valve comprising an integral seat.

BACKGROUND

Valves often comprise a valve member housed within a valve body, and a valve seat positioned between the valve member and the valve body to form a seal when the valve is placed in a closed configuration. Examples of common valve members include the ball of a ball valve, the disc of a butterfly valve, and the gate of a gate valve. The valve seat often is made of a resilient member that elastically deforms due to contact with the valve member to form the seal between the valve member and the seat. However, current valve seats are prone to failure, allowing fluid or gas to leak across the valve. Additionally, should the valve seat and/or the valve member become off-centered, abnormal wear on the valve seat can reduce the life cycle of the valve.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a valve body assembly comprising a valve body defining a first end, a second end opposite the first end, and an inner body surface, the inner body surface defining a main valve bore extending from the first end to the second end; and an integral valve seat integrally attached to the inner body surface within the main valve bore, the integral valve seat comprising an additive material additively deposited on the inner body surface, the integral valve seat defining a seating surface configured to confront and seal with a valve member.

Also disclosed is a valve assembly comprising a valve body defining an inner body surface, the inner body surface defining a main valve bore; and an integral valve seat integrally attached to the inner body surface within the main valve bore, the integral valve seat comprising an additive material additively deposited on the inner body surface, the integral valve seat defining a seating surface; and a valve member arranged within the main valve bore and movable between an open orientation and a closed orientation, and wherein, in the closed orientation, the valve member seals with the integral valve seat to prohibit fluid flow through the main valve bore.

Additionally, disclosed is a method of manufacturing a valve body comprising providing the valve body defining an inner body surface, the inner body surface defining a main valve bore; and integrally forming an integral valve seat with the valve body by a hybrid manufacturing process, wherein the hybrid manufacturing process comprises: depositing an additive material onto the inner body surface of the valve body, the additive material forming the integral valve seat; and machining the integral valve seat to a desired size and shape.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
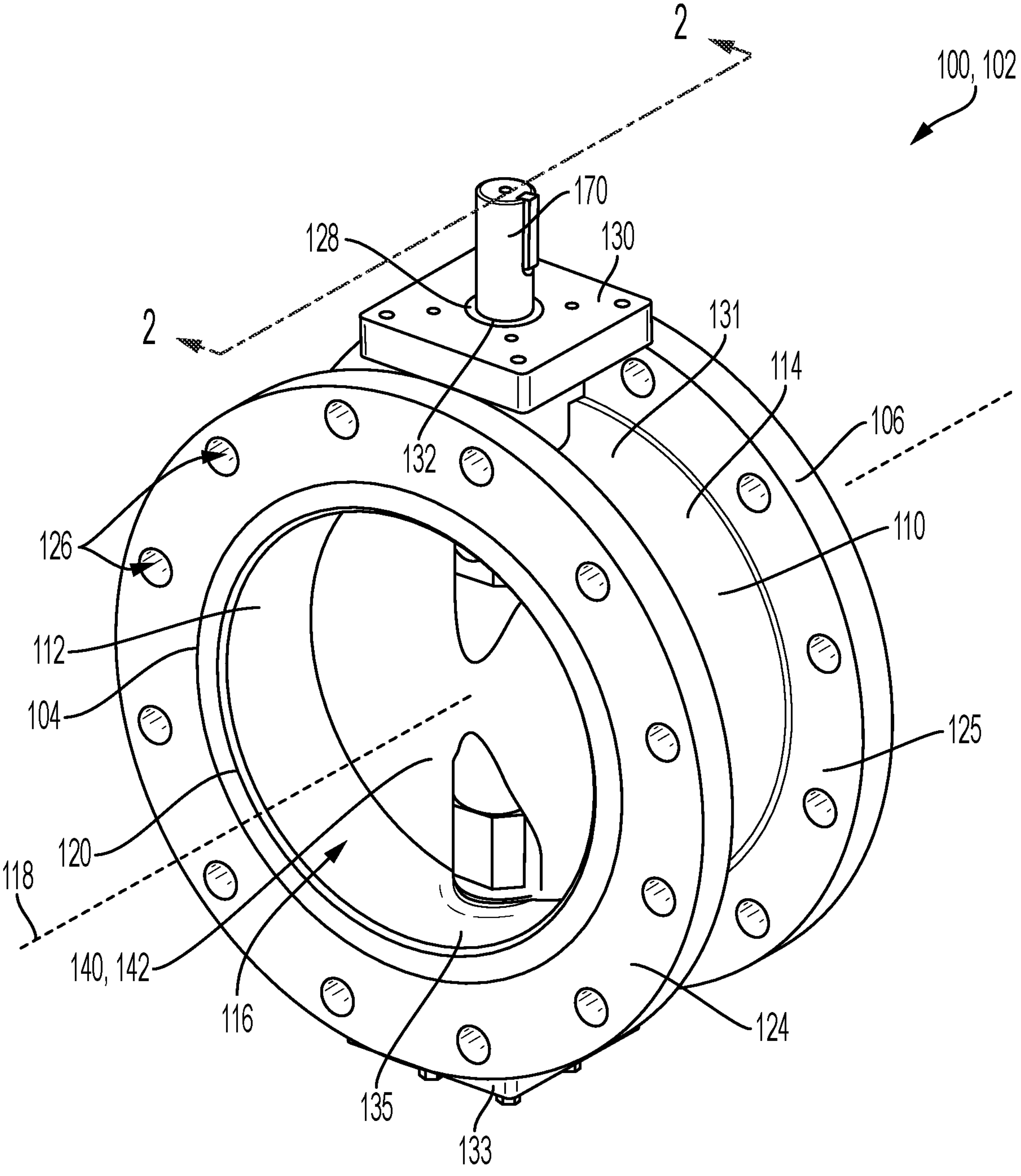
FIG. 1 is a perspective view of a valve with an integral valve seat, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a valve assembly and associated methods, systems, devices, and various apparatus. Example aspects of the valve assembly can comprise a valve body, a valve member housed within the valve body, and a valve seat positioned between the valve member and the valve body and integrally attached to the valve body. It would be understood by one of skill in the art that the valve assembly is described in but a few exemplary embodiments among many. No particular terminology or description should be considered limiting on the disclosure or the scope of any claims issuing therefrom.

FIG. 1 illustrates a valve 100 according to an example aspect of the present disclosure. In the present aspect, the valve 100 can be a butterfly valve 102. However, in other aspects, the valve 100 can be any other suitable valve, including but not limited to, a ball valve, a plug valve, a gate valve, or the like. The butterfly valve 102 can define a first end 104 and a second end 106 opposite the first end 104. According to example aspects, the butterfly valve 102 can comprise a valve body 110, a valve member 140, and a valve seat 250 (shown in FIG. 2) formed integrally with the valve body 110. That is, the valve seat 250 and the valve body 110 can be permanently affixed together to make up a single complete piece, so as to be incapable of being easily dismantled without destroying the integrity of the piece. The integrally formed valve seat 250 is described in further detail below. As shown, the butterfly valve 102 can also comprise a valve shaft 170 engaged with the valve member 140 and configured to move the valve member 140 between an open orientation and a closed orientation (closed orientation shown in FIGS. 1 and 2). In some aspects, the valve shaft 170 can be a two-piece valve shaft comprising an upper valve shaft and a lower valve shaft, as described in further detail below.

The valve body 110 can extend from the first end 104 to the second end 106, and can define an inner body surface 112 and an outer body surface 114. Each of the inner body surface 112 and the outer body surface 114 can be substantially cylindrical in the present aspect. The inner body surface 112 can define a main valve bore 116 extending through the valve body 110 from the first end 104 to the second end 106. The valve body 110 can define a first bore opening 120 at the first end 104 of the valve 100 and a second bore opening 222 (shown in FIG. 2) at the second end 106 of the valve 100. Each of the first bore opening 120 and the second bore opening 222 can allow access to the main valve bore 116. Water, or any other suitably fluid or gas, can be configured to flow through the main valve bore 116 in the open configuration. The main valve bore 116 can define a main bore axis 118 extending centrally therethrough.

In example aspects, the valve body 110 can comprise a first annular flange 124 and the first end 104 and a second annular flange 125 at the second end 106. One or more mounting fastener holes 126 can be formed through each of the first and second annular flanges 124,125. A mounting fastener, such as a bolt for example and without limitation, can extend through each corresponding mounting fastener hole 126 to mount the butterfly valve 102 to a surrounding structure, such as a pipeline (e.g., a municipal water pipeline, for example and without limitation). In other aspects, the valve body 110 can further comprise one or more fastener lugs extending radially outward from the outer body surface 114. One or more of the mounting fastener holes 126 can be formed through each of the fastener lugs, and a mounting fastener can extend through each corresponding mounting fastener hole 126 to mount the butterfly valve 102 (or other suitable valve) to the surrounding structure.

According to example aspects, the valve body 110 can be formed by a casting process, such as sand casting or lost-foam casting. In some aspects, the valve body 110 can be formed from cast iron. For example and without limitation, the valve body 110 may be cast from grey iron or ductile iron in some aspects. In other aspects, the valve body 110 can comprise any other suitable material or combination of materials, including but not limited to other metals or metal alloys, plastics, and components. Moreover, in other aspects, the valve body 110 can be formed by any other suitable manufacturing process or combination of processes known in the art.

Example aspects of the butterfly valve 102 can further comprise an upper gland flange 130 extending from the outer body surface 114 at an upper body end 131 of the valve body 110 and a lower gland flange 205 (shown in FIG. 2) extending from the outer body surface 114 at a lower body end 135 of the valve body 110, opposite the upper body end 131. A gland packing 128 can be recessed within a flange cavity 236 (shown in FIG. 2) of each of the upper gland flange 130 and the lower gland flange 205. The upper gland flange 130 can define a gland opening 132 configured to receive the valve shaft 170 therethrough, and the valve shaft 170 can extend into, and in some cases through, each of the upper and lower gland flanges 130,205. The valve shaft 170 can further extend into, and in some cases through, each of the gland packings 128.

In example aspects, the upper gland flange 130 can be configured for mounting a valve actuator thereon, and the valve actuator can drive the movement of the valve member 140 between the open and closed orientations. The valve actuator can be, for example, a quarter-turn manual actuator, a gear box, or a motor, for example and without limitation. According to example aspects, mounting the valve actuator to the upper gland flange 130 can compress the gland packing 128 in the upper gland flange 130, thereby energizing the gland packing 128. Additionally, a lower gland cap 133 can be mounted to the lower gland flange 205 and can compress and energize the gland packing 128 in the lower gland flange 205.

The valve shaft 170 can extend vertically through the valve body 110, transverse to the main valve bore 116, relative to the orientation shown. The valve shaft 170 can further extend through the valve member 140. The valve member 140 can be a substantially circular butterfly disc 142 in the present aspect. As shown, the valve member 140 can be positioned within the main valve bore 116. The valve member 140 is shown in the closed orientation, wherein the valve member 140 can seal with the valve seat 250 formed integrally with the valve body 110, as described in further detail below. In the closed orientation, the valve member 140 can block the main valve bore 116 and can prohibit fluid flow therethrough. The valve member 140 can be rotated about and between the open and closed orientations, respectively. In the open orientation, the valve member 140 can be disposed partially or substantially sideways within the main valve bore 116, allowing fluid to pass around the valve member 140 and through the main valve bore 116.

According to example aspects, the valve shaft 170 can be fixedly coupled to the valve member 140, such that rotating the valve shaft 170, such as with the valve actuator, can rotate the valve member 140 about and between the open orientation and the closed orientation. In example aspects, the valve member 140 can comprise a substantially rigid material. For example, the valve member 140 can comprise a metal material in some aspects, such as, for example and without limitation, CF8M, NAB, MONEL, WCB, iron (including ductile iron), or the like. In other aspects, the valve member 140 can comprise any other suitable material.

Figure 2:
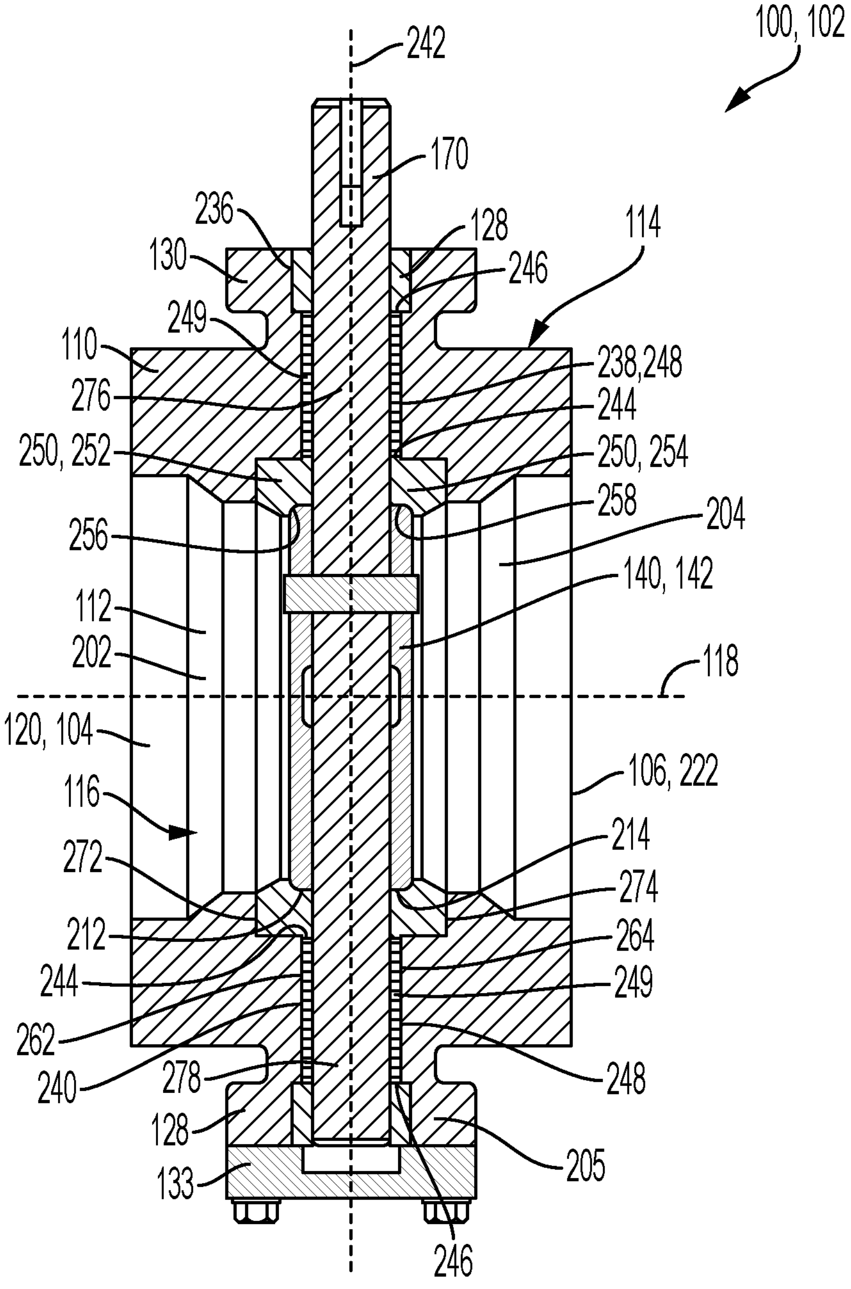
FIG. 2 is a cross-sectional view of the valve of FIG. 1 taken along line 2-2 in FIG. 1.

FIG. 2 illustrates a cross-sectional view of the butterfly valve 102 taken along line 2-2 in FIG. 1. As shown, the butterfly valve 102 can define the first end 104 and the second end 106 opposite the first end 104. The butterfly valve 102 can comprise the valve body 110, the valve member 140, and the valve seat 250 formed integrally with the valve body 110. The valve shaft 170 can be engaged with the valve member 140 and can move the valve member 140 between the open orientation and the closed orientation. The valve body 110 can define the inner body surface 112 and the outer body surface 114, and the inner body surface 112 can define the main valve bore 116 extending through the valve body 110 from the first end 104 to the second end 106. The first bore opening 120 can be defined at the first end 104 and the second bore opening 222 can be defined at the second end 106. According to example aspects, the main valve bore 116 can define an inlet region 202 extending inward from the first end 104 and an outlet region 204 opposite the inlet region 202 and extending inward from the second end 106.

The valve body 110 can define an upper shaft bore 238 and a lower shaft bore 240, each extending through the valve body 110 from the inner body surface 112 to the outer body surface 114. The upper shaft bore 238 and the lower shaft bore 240 can share a common shaft bore axis 242 and can be arranged between the inlet and outlet regions 202,204 of the main valve bore 116. The shaft bore axis 242 can be about perpendicular to the main bore axis 118. In example aspects, the upper shaft bore 238 and the lower shaft bore 240 can be about axially centered between the first end 104 and the second end 106 of the valve body 110, relative to the main bore axis 118. The valve shaft 170 can engage each of the upper shaft bore 238 and the lower shaft bore 240, as shown. For example, an upper shaft portion 276 of the valve shaft 170 can engage the upper shaft bore 238, and a lower shaft portion 278 of the valve shaft 170 can engage the lower shaft bore 240. In aspects of the valve shaft 170 comprising the upper valve shaft and the lower valve shaft, the upper valve shaft can be positioned at least partially within the upper shaft bore 238 of the valve body 110 and secured to a top of the valve member 140, and the lower valve shaft can be positioned at least partially within the lower shaft bore 240 of the valve body 110 and secured to the bottom of the valve member 140. Examples of such a two-piece valve shaft are disclosed in U.S. Pat. No. 10,378,656, issued Aug. 13, 2019, which is hereby specifically incorporated by reference herein in its entirety.

Each of the upper shaft bore 238 and the lower shaft bore 240 can respectively define an inner shaft opening 244 at the inner body surface 112, such that the upper and lower shaft bores 238,240 can be in communication with the main valve bore 116. Each of the upper and lower shaft bores 238,240 can further respectively define outer shaft opening 246 opposite the inner shaft opening 244. The outer shaft opening 246 of the upper shaft bore 238 can be arranged proximate to the upper gland flange 130, such that the upper shaft bore 238 can be in communication with the upper flange cavity 236. Moreover, each of the upper shaft bore 238 and the lower shaft bore 240 can respectively define a shaft bore surface 248 extending between the respective inner shaft opening 244 and outer shaft opening 246. In example aspects, a bearing 249 can be positioned within either or both of the upper shaft bore 238 and the lower shaft bore 240 between the shaft bore surface 248 and the valve shaft 170 to facilitate rotating the valve shaft 170 within the upper and lower shaft bores 238,240.

The valve seat 250 can be positioned within the main valve bore 116 and can be integrally attached to the inner body surface 112 of the valve body 110. Example aspects of the valve seat 250 can comprise a substantially annular first seat portion 252 extending about a circumference of the main valve bore 116 and a substantially annular second seat portion 254 extending about the circumference of the main valve bore 116. Each of the first seat portion 252 and the second seat portion 254 can be positioned adjacent to the upper and lower shaft bores 238,240. The first seat portion 252 can be oriented within a substantially annular first body groove 272 or channel of the valve body 110 at a first bore side 262 of the upper and lower shaft bores 238,240 (e.g., closer to the first end 104 of the valve body 110). The second seat portion 254 can be oriented within a substantially annular second body groove 274 or channel at a second bore side 264 of the upper and lower shaft bores 238,240 (e.g., closer to the second end 106 of the valve body 110).

As shown, in the closed orientation, the valve member 140 (e.g., the butterfly disc 142) can be rotated into circumferential contact with the valve seat 250 to seal therewith, prohibiting fluid from flowing around the valve member 140 and through the main valve bore 116. For example, the first seat portion 252 can define a first seating surface 256 that can circumferentially contact and form an annular seal with a first sealing surface 212 of the valve member 140 in the closed orientation. Similarly, the second seat portion 254 can define a second seating surface 258 that can circumferentially contact and form an annular seal with a second sealing surface 214 of the valve member 140. In the open orientation, the valve member 140 can be rotated to a partially or substantially sideways orientation within the main valve bore 116, such that the valve member 140 only contacts the valve seat 250 at the top and the bottom of the valve member 140, thereby allowing fluid to pass around the valve member 140 and through the main valve bore 116.

According to example aspects, the valve seat 250 can be integrally attached to the inner body surface 112 by depositing an additive material 410 (shown in FIG. 4) onto the inner body surface 112. The additive material 410 can be deposited at a target location(s) 320 (shown in FIG. 3) on the inner body surface 112, as described in further detail below. In some aspects, the additive material 410 can be a metal powder or wire, such as a steel powder or wire, a nickel powder or wire, or a bronze powder or wire, for example and without limitation. In other aspects, the additive material 410 can be any other suitable material known in the art, including metal and non-metal materials. According to example aspects, the additive material 410 can be deposited onto the inner body surface 112 of the valve body 110 by additive manufacturing. Additive manufacturing is beneficial in that it provides a permanent attachment of the integral valve seat 250 to the valve body 110, which eliminates the possibility of the valve seat 250 detaching from or becoming misaligned with the valve body 110 and the associated costly repairs. Example aspects of an additive manufacturing process are further described in U.S. application Ser. No. 17/588,962, filed Jan. 31, 2022, which is hereby specifically incorporated by reference herein in its entirety.

Figure 3:
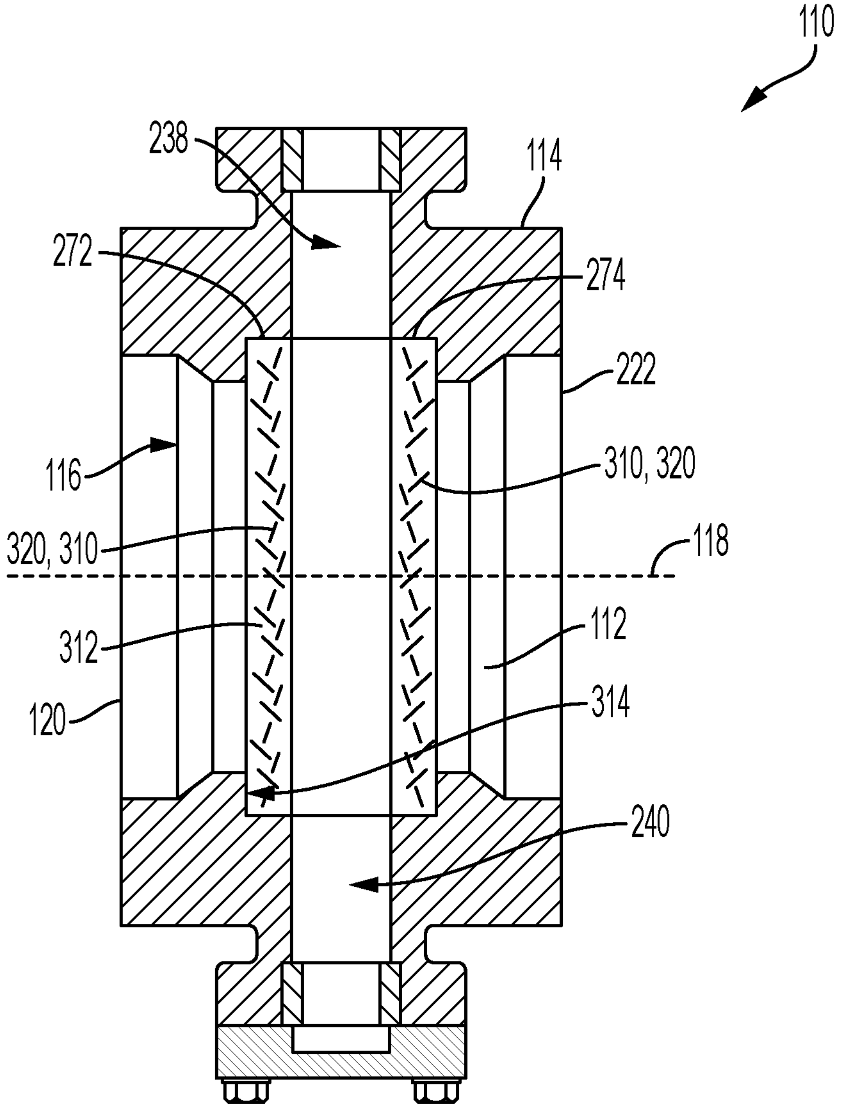
FIG. 3 is a cross-sectional view of a valve body of the valve of FIG. 1 taken along line 2-2 in FIG. 1, illustrating a first step in integrally forming the valve seat with the valve.
Figure 4:
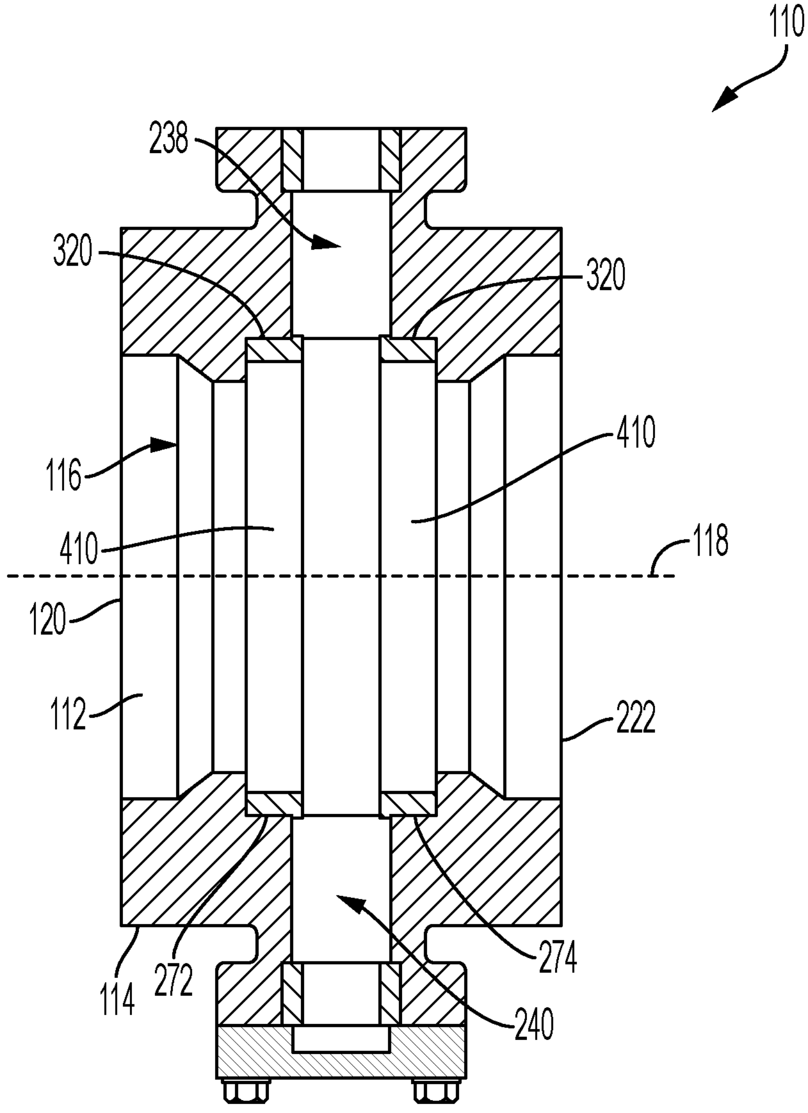
FIG. 4 is a cross-sectional view of the valve body of the valve of FIG. 1 taken along line 2-2 in FIG. 1, illustrating a second step in integrally forming the valve seat with the valve.
Figure 5:
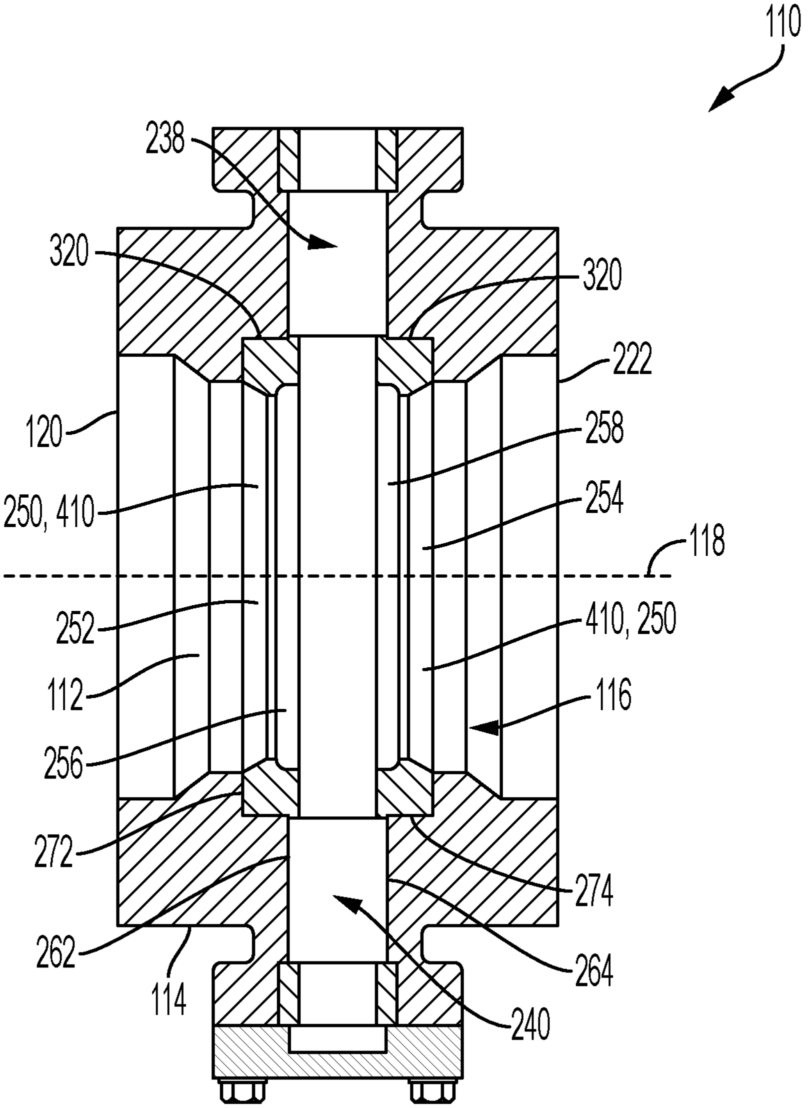
FIG. 5 is a cross-sectional view of the valve body of the valve of FIG. 1 taken along line 2-2 in FIG. 1, illustrating the valve seat integrally attached to the valve.

FIGS. 3-5 illustrate the process of depositing the additive material 410 (shown in FIG. 4) onto the pre-cast valve body 110 to form the integral valve seat 250 (shown in FIG. 2) therewith. As described above, the additive material 410 can be deposited onto the inner body surface 112 of the valve body 110 by additive manufacturing. In example aspects, the additive material 410 can be a metal powder or metal wire, for example and without limitation. In the present aspect, the additive material 410 can be a nickel powder. In other aspects, the additive material 410 can be any other suitable material known in the art, metal or non-metal.

Referring to FIG. 3, the valve body 110 is illustrated prior to forming the integral valve seat 250 (shown in FIG. 2) therewith. In example aspects, the valve body 110 can be cast as a single monolithic component (i.e., formed a singular component that constitutes a single material without joints or seams) prior to additively depositing the integral valve seat 250. In example aspects, the inner body surface 112 of the valve body 110 can define one or more textured or rough regions 310, which can be formed during the casting of the valve body 110 and/or after casting. The rough regions 310 can be formed at the target location(s) 320 where the additive material 410 (shown in FIG. 4) is to be deposited onto the inner body surface 112. Thus, in the present aspect, the rough regions 310 can be formed within the first and second body grooves 272,274 of the valve body 110. According to example aspects, the rough regions 310 can create an improved sealing surface for adhering the additive material 410 to the inner body surface 112. More specifically, the rough regions 310 can define a plurality of imperfections (e.g., scuffs, scratches, etc.) that the additive material 410 can flow into to enhance the strength of the attachment between the valve body 110 and the valve seat 250.

As shown, the rough regions 310 can be formed on a substantially axial notch surface 312 (relative to the main bore axis 118) of each of the first and second body grooves 272,274. In some aspects, the rough regions 310 can further be formed on a substantially radial notch surface 314 (relative to the main bore axis 118) of each of the first and second body grooves 272,274. In other aspects, the rough regions 310 can be formed on either or neither of the substantially axial notch surfaces 312 and the substantially radial notch surfaces 314. In some aspects, the valve body 110 may not comprise or require the rough regions 310, and the additive material 410 can be deposited directly onto a substantially smooth inner body surface 112 of the valve body 110.

The rough regions 310 can be formed by scuffing, scratching, cutting, or otherwise roughing up the inner body surface 112 at the target locations 320 so that the rough regions 310 can be generally rough relative to the surrounding portions of the inner body surface 112. For example, in some aspects, a cutting tool can be utilized by a CNC machine (or other suitable machine) to scratch the rough regions 310 onto the inner body surface 112. Additionally, in the example aspects, the integral valve seat 250 can be deposited onto the inner body surface 112 of the valve body 110 and then precision-machined to the desired shape and size by the process of hybrid manufacturing. In hybrid manufacturing, both additive manufacturing (i.e., depositing the additive material 410 on the valve body 110 to form the integral valve seat 250) and subtractive manufacturing (i.e., precision-machining the integral valve seat 250) can be performed by the same machine, such as a CNC machine.

Hybrid manufacturing has many benefits, including by not limited to, reduced manufacturing time, reduced labor, and reduced material waste. In the present aspect, the integral valve seat 250 can be deposited and precision machined by an additive head and a cutting tool, respectively, both of which can be operated by a singular CNC machine. In example aspects, the rough regions 310 can also be scratched into the inner body surface 112 by the same CNC machine, such that the rough regions 310 can be formed and the integral valve seat 250 can be deposited and precision-machined all by the same machine. In such an aspect, the pre-cast valve body 110 can be loaded into the CNC machine, and the entire process of forming the integral valve seat 250 therewith can be performed without removing the valve body 110 from the CNC machine, which can both improve productivity and reduce manufacturing costs and labor. In other aspects, the singular machine for scratching the rough regions 310 and depositing and machining the integral valve seat 250 can be any other suitable machine. In other aspects, the rough regions 310 can be cast along with the valve body 110 during the casting process (e.g., sand casting or lost-foam casting, for example and without limitation), prior to loading the valve body 110 into the CNC machine.

Referring now to FIG. 4, the valve body 110 is illustrated as part-way through the additive manufacturing process. According to example aspects, the additive material 410 (e.g., the nickel powder, for example and without limitation) that forms the integral valve seat 250 (shown in FIG. 2) can be deposited in a plurality of layers onto the rough regions 310 (shown in FIG. 3) at the target locations 320 to incrementally build up the integral valve seat 250 on the inner body surface 112. Forming the integral valve seat 250 by the process of additive manufacturing can result in the integral valve seat 250 being integrally and permanently attached to the valve body 110. The permanent attachment achieved by additive manufacturing is beneficial in that it can eliminate the possibility of the integral valve seat 250 misaligning or detaching from the valve body 110.

According to example aspects, the additive material 410 of the integral valve seat 250 can be deposited by the CNC machine's additive head by plasma arc additive manufacturing, laser additive manufacturing, cold spray additive manufacturing, or any other suitable additive manufacturing process known in the art. Plasma arc additive manufacturing utilizes heated gas expelled through a plasma torch to melt the additive material 410, and the melted additive material 410 can be applied to the inner body surface 112 in layers. Similarly, laser additive manufacturing utilizes a laser to heat and melt the additive material 410, and the melted additive material 410 can be applied in layers. In cold spray manufacturing, a powdered additive material 410 (e.g., the nickel powder, for example and without limitation) is accelerated in a high-velocity compressed gas stream. The particles of the additive material 410 can deform and bond together to create a layer upon impact with the inner body surface 112. Additional layers of the additive material 410 can then be added. As previously described, in example aspects, the additive material 410 can be deposited on the inner body surface 112 by an additive head of the same CNC machine that is used to form the rough regions 310 and to precision-machine the valve seat 250.

In some aspects, the additive manufacturing process can utilize a Powder Bed Fusion (PBF) technique. Examples of Powder Bed Fusion techniques include selective laser sintering (SLS), direct metal laser sintering (DMLS), selective laser melting (SLM), multi jet fusion (MJF), and electron-beam additive manufacturing (also known as electron-beam melting, or EBM), for example and without limitation. Selective laser sintering can include both metals and polymers, while direct metal laser sintering can be utilized for metals. Both selective laser sintering and direct metal laser sintering can use a laser as the power source to sinter a powdered additive material 410 and bind the material 410 together to create a solid structure. Selective laser melting can melt the powdered additive material 410 using a high-energy laser to create fully dense materials in a layer-wise method. Electron-beam melting can melt a metal powdered additive material 410 layer by layer with an electron beam in a high vacuum. Multi jet fusion is a powder-based technique that applies fusing and detailing agents which are then combined by heating to create a solid layer.

FIG. 5 illustrates the valve body 110 after the additive manufacturing process has been completed and the additive material 410 is fully deposited onto the inner body surface 112 at the target locations 320 to form the integral valve seat 250. Once the additive manufacturing process is completed, the integral valve seat 250 can then be machined to the desired shape and size by the subtractive manufacturing process. In hybrid manufacturing, the subtractive manufacturing can be performed by the same machine (such as the CNC machine) that is used to perform the additive manufacturing. For example, in the present aspect, the CNC machine can pick up and operate a cutting tool to cut the valve seat 250 as desired. The CNC machine can be a CNC mill, a CNC lathe, or any other suitable type of CNC machine.

As shown, the integral valve seat 250 can comprise the first and second seat portions 252,254 permanently attached to the valve body 110 within the first and second body grooves 272,274, respectively. The first and second seat portions 252,254 can be substantially annular and can be arranged proximate to the first and second bore sides 262, 264, respectively, of the upper and lower shaft bores 238, 240. The precision-machined first and second seat portions 252,254 of the integral valve seat 250 can respectively define the first and second seating surfaces 256,258, which can seal with the valve member 140 (shown in FIG. 1) in the closed orientation of the valve 100 (shown in FIG. 1).

Figure 6:
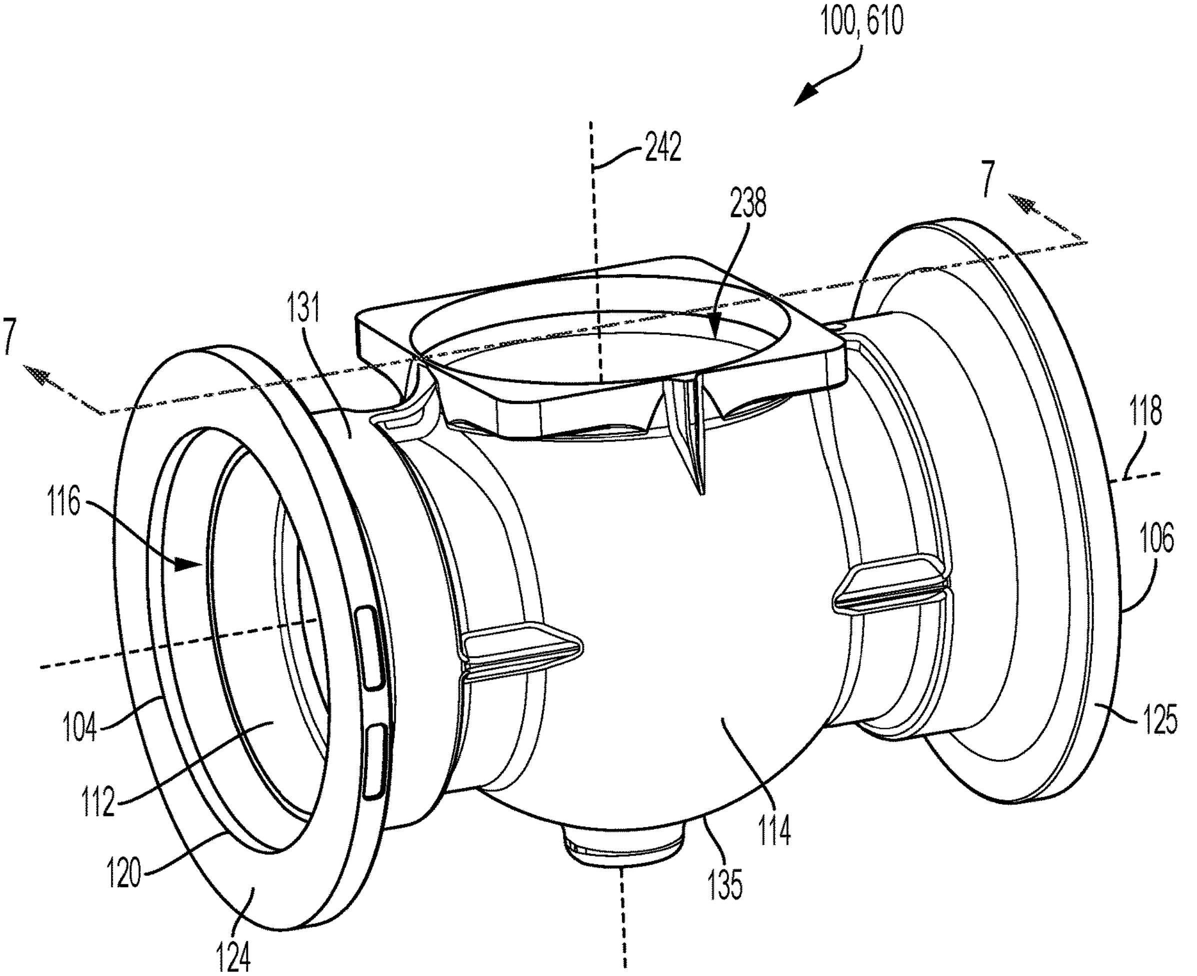
FIG. 6 is a perspective view of the valve body of the valve, in accordance with another aspect of the present disclosure.

FIG. 6 illustrates the valve body 110 in accordance with another example aspects of the disclosure. In the present aspect, the valve body 110 can be a plug valve body 610 for a plug valve. Example plug valves are disclosed in U.S. Pat. No. 10,808,850, issued on Oct. 20, 2020, which is hereby specifically incorporated by referenced herein. The plug valve can comprise the plug valve body 610, the valve member 140 (shown in FIG. 1), and the valve seat 250 (shown in FIG. 9) formed integrally with the plug valve body 610. That is, the valve seat 250 and can be permanently affixed to the plug valve body 610 to make up a single complete piece, so as to be incapable of being easily dismantled without destroying the integrity of the piece. The valve shaft 170 (shown in FIG. 1) can be engaged with the valve member 140 and can be configured to move the valve member 140 between the open orientation and the closed orientation, as previously described. In the present aspect, the valve member 140 can be a valve plug.

According to example aspects, the plug valve body 610 can define the first end 104 and the second end 106 of the plug valve. The plug valve body 610 can extend from the first end 104 to the second end 106, and can define the inner body surface 112 and the outer body surface 114. The inner body surface 112 can define the main valve bore 116 extending through the plug valve body 610 from the first end 104 to the second end 106. The first bore opening 120 can be formed at the first end 104 of the plug valve body 610 and the second bore opening 222 (shown in FIG. 7) can be formed at the second end 106 of the plug valve body 610. The main valve bore 116 can define the main bore axis 118 extending centrally therethrough. The plug valve body 610 can further comprise the first annular flange 124 and the first end 104 and the second annular flange 125 at the second end 106. One or more of the mounting fastener holes 126 (shown in FIG. 1) can be formed through each of the first and second annular flanges 124,125 for mounting the plug valve body 610 to a surrounding structure, such as a pipeline.

Additionally, the upper shaft bore 238 can extend through the plug valve body 610 at the upper body end 131 thereof from the inner body surface 112 to the outer body surface 114. The valve shaft 170 can extend through the upper shaft bore 238, transverse to the main valve bore 116, relative to the orientation shown. The valve shaft 170 can further be coupled the valve member 140 (e.g., the valve plug). The valve member 140 can be positioned within the main valve bore 116 and can seal with the valve seat 250 formed integrally with the valve body 110 in the closed orientation, as described in further detail below. In the closed orientation, the valve member 140 can block the main valve bore 116 and can prohibit fluid flow therethrough. In the open orientation, the valve member 140 can be turned within the main valve bore 116, allowing fluid to pass around the valve member 140 and through the main valve bore 116.

Like the valve body 110 of FIGS. 1-5, the plug valve body 610 can be formed by a casting process in example aspects. In some aspects, the plug valve body 610 can be formed from cast iron. For example and without limitation, the plug valve body 610 may be cast from grey iron or ductile iron in some aspects. In other aspects, the plug valve body 610 can comprise any other suitable material or combination of materials, including but not limited to other metals or metal alloys, plastics, and components. Moreover, in other aspects, the plug valve body 610 can be formed by any other suitable manufacturing process or combination of processes known in the art.

Figure 7:
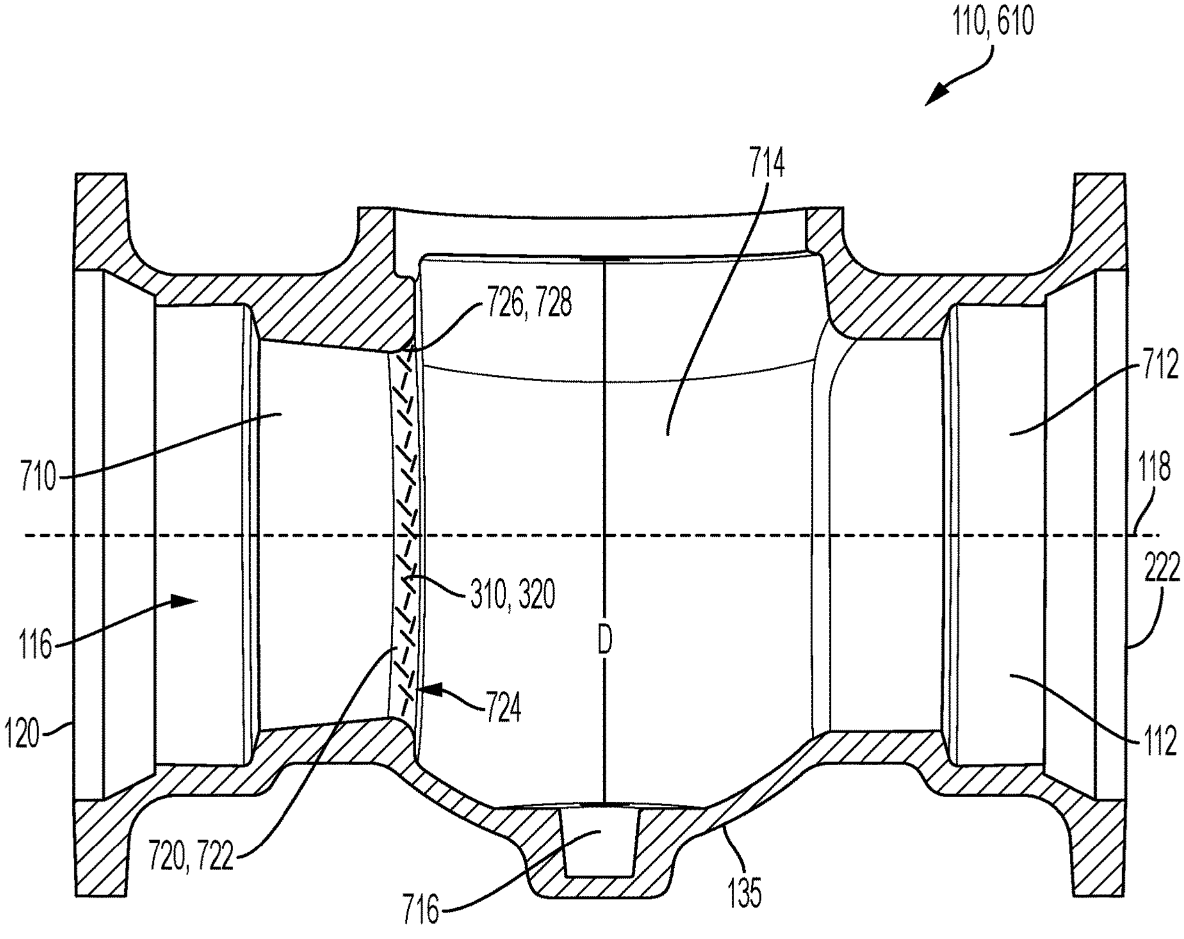
FIG. 7 is a cross-sectional view of the valve body of FIG. 6 taken along line 7-7 in FIG. 6, illustrating a first step in integrally forming the valve seat with the valve body.
Figure 8:
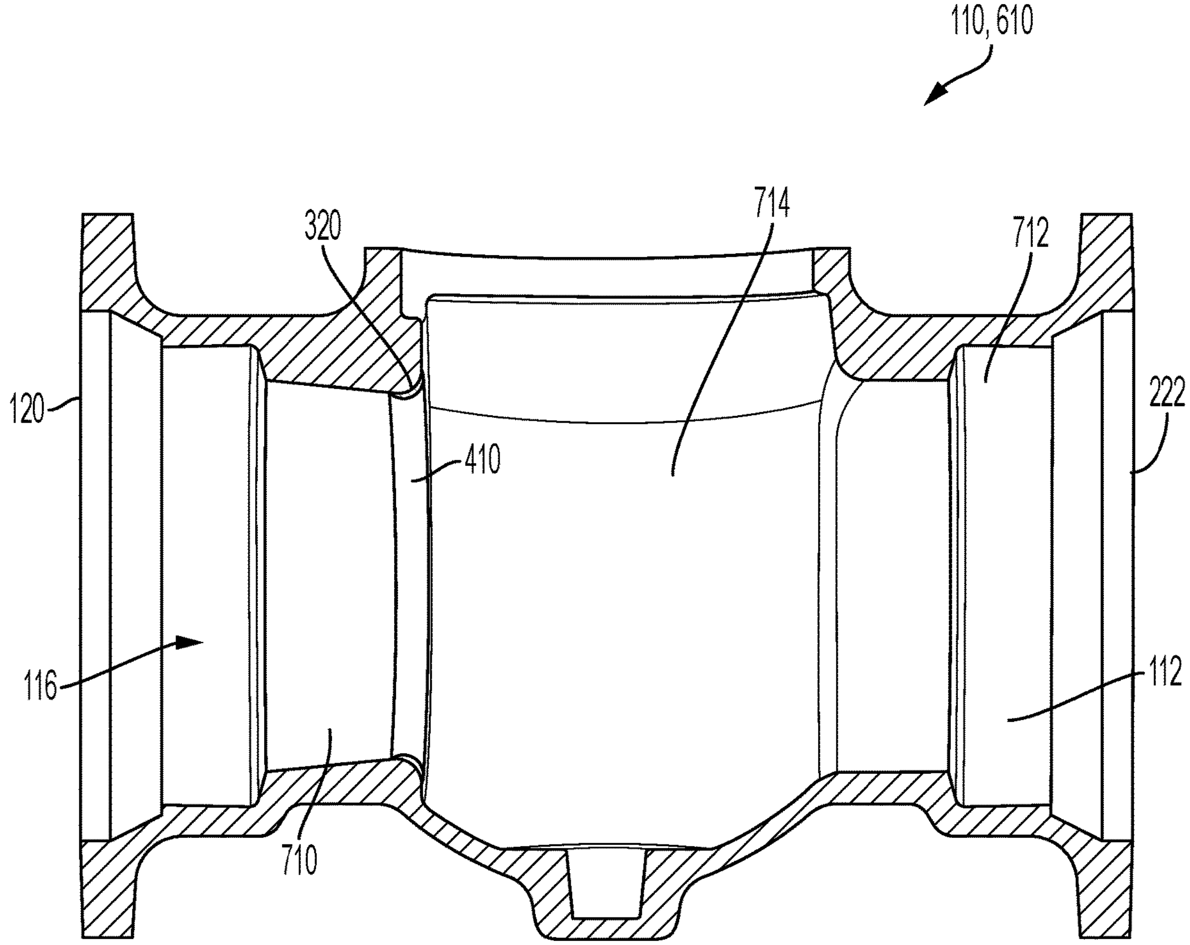
FIG. 8 is a cross-sectional view of the valve body of FIG. 6 taken along line 7-7 in FIG. 6, illustrating a second step in integrally forming the valve seat with the valve body.
Figure 9:
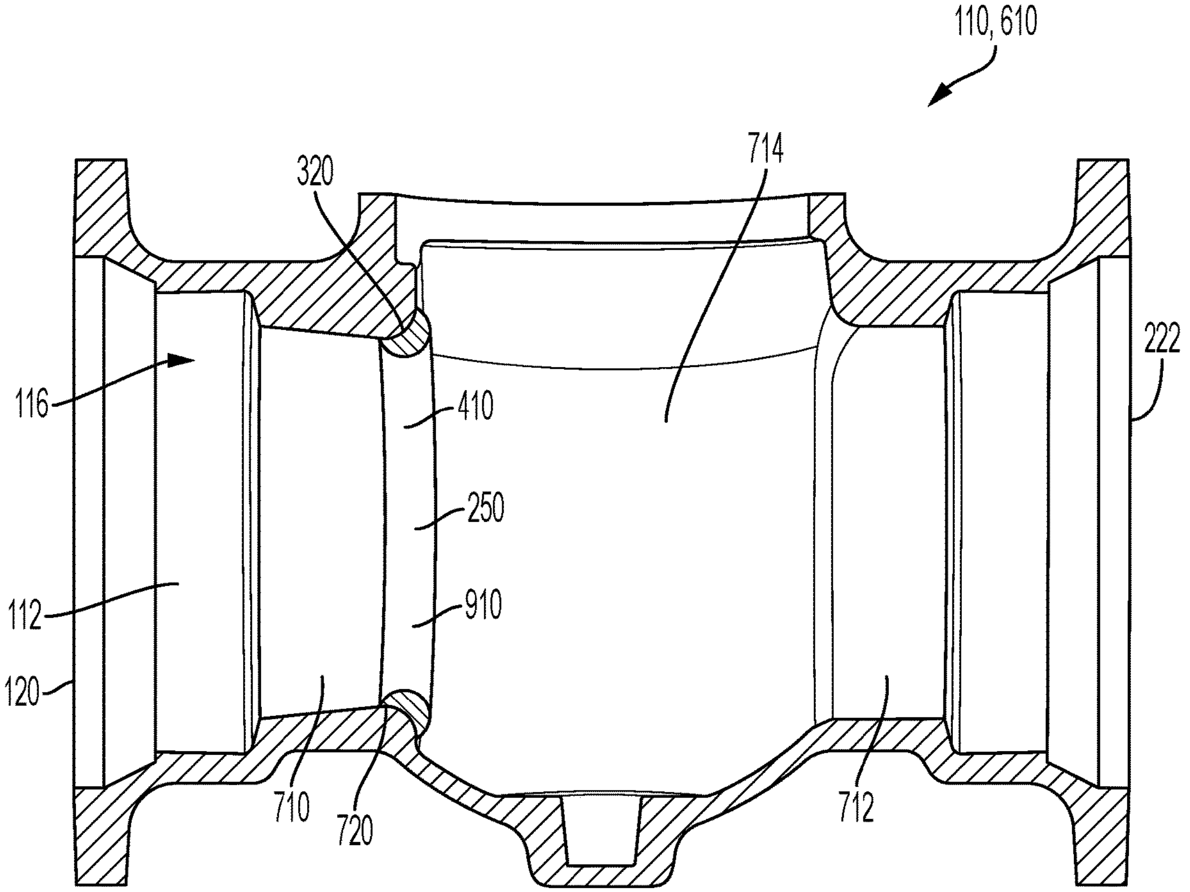
FIG. 9 is a cross-sectional view of the valve body of FIG. 6 taken along line 7-7 in FIG. 6, illustrating the valve seat integrally attached to the valve body.

FIG. 7-9 illustrate the process of depositing the additive material 410 (shown in FIG. 8) onto the pre-cast plug valve body 610 to form the integral valve seat 250 (shown in FIG. 9) therewith. The additive material 410 can be deposited onto the inner body surface 112 of the plug valve body 610 by additive manufacturing, as previously described. In example aspects, the additive material 410 can be a metal powder or metal wire, for example and without limitation. In the present aspect, the additive material 410 can be a nickel powder. In other aspects, the additive material 410 can be any other suitable material known in the art, metal or non-metal.

FIG. 7 illustrates a cross-sectional view of the plug valve body 610 taken along line 7-7 in FIG. 6, prior to forming the integral valve seat 250 (shown in FIG. 9) therewith. In example aspects, the plug valve body 610 can be cast as a single monolithic component (i.e., formed a singular component that constitutes a single material without joints or scams) prior to additively depositing the integral valve seat 250. According to example aspects, the main valve bore 116 can define an inlet region 710, an outlet region 712 opposite the inlet region 710, and a central region 714 therebetween. The central region 714 can be configured to receive the valve member 140 (shown in FIG. 1), e.g., the valve plug, which can be rotated therein between the open and closed orientations. In some example aspects, the central region 714 can define a diameter D and/or a width that can be larger than a diameter and/or width of the adjacent inlet and outlet regions 710,712. In some aspects, the plug valve body 610 may not comprise the lower shaft bore 240 (shown in FIG. 2). Rather, as shown in the present aspect, the inner body surface 112 of the plug valve body 610 can define a lower shaft notch 716 formed at the lower body end 135. The lower shaft notch 716 can be configured to receive the lower shaft portion 278 (shown in FIG. 2) of the valve shaft 170 (shown in FIG. 1).

In example aspects, the inner body surface 112 of the plug valve body 610 can define one or more of the textured or rough regions 310, which can be formed at the target location(s) 320 where the additive material 410 (shown in FIG. 8) is to be deposited onto the inner body surface 112. The rough region(s) 310 can create an improved sealing surface for adhering the additive material 410 to the inner body surface 112. The rough region(s) 310 can be formed by scuffing, scratching, cutting, or otherwise roughing up the inner body surface 112 at the target location(s) 320 so that the rough region(s) 310 can be generally rough relative to the surrounding portions of the inner body surface 112. For example, in some aspects, a cutting tool can be utilized by a CNC machine (or other suitable machine) to scratch the rough region(s) 310 onto the inner body surface 112, as previously described.

In the present aspect, the inner body surface 112 can define a substantially annular rough region 310 at an inward end 720 of the inlet region 710 of the main valve bore 116, adjacent to the central region 712. The substantially annular rough region 310 can define a substantially axial portion 722 (relative to the main bore axis 118) at the inward end 720 of the inlet region 710. In some aspects, the rough region 310 can also define a substantially radial portion 724 (relative to the main bore axis 118) extending into the central region 714. In some aspects, the rough region 310 can further define a substantially curved portion 726 at a curved junction 728 between the inlet region 710 and the central region 714. Other aspects of the inner body surface 112 can define any of the axial portion 722, the radial portion 724, and/or the curved portion 7246 of the rough region 310. Other aspects of the inner body surface 112 may not comprise the rough region 310 at all, and the additive material 410 can be deposited directly onto a substantially smooth inner body surface 112 of the plug valve body 610.

Referring now to FIG. 8, the plug valve body 610 is illustrated as part-way through the additive manufacturing process. According to example aspects, the additive material 410 (e.g., the nickel powder, for example and without limitation) that forms the integral valve seat 250 (shown in FIG. 9) can be deposited in a plurality of layers onto the rough region 310 (shown in FIG. 7) at the target location 320 to incrementally build up the integral valve seat 250 on the inner body surface 112. As described, integrally forming the valve seat 250 with the plug valve body 610 can permanently attach the valve seat 250 thereto, thereby eliminating the possibility of the integral valve seat 250 misaligning or detaching from the plug valve body 610. In example aspects, the additive material 410 can be deposited onto the inner body surface 112 by the same CNC machine (or other suitable machine) that can scratch up the inner body surface 112 to form the rough regions 310. The additive material 410 can be deposited utilizing any number of suitable additive manufacturing processes, as previously described.

FIG. 9 illustrates the plug valve body 610 after the additive manufacturing process has been completed and the additive material 410 is fully deposited onto the inner body surface 112 at the target location 320 to form the integral valve seat 250. Once the additive manufacturing process is completed, the integral valve seat 250 can then be machined to the desired shape and size by the subtractive manufacturing process previously described. For example, in the present aspect, the same CNC machine (or other suitable machine) that scratched up the rough regions 310 (shown in FIG. 7) and deposited the additive material 410 onto the inner body surface 112 can pick up and operate a cutting tool to precision-cut the valve seat 250 as desired.

The integral valve seat 250 can be substantially annular in the present aspect and can be arranged generally at the inward end 720 of the inlet region 710, as shown. The integral valve seat 250 can moreover be substantially bulbous in the present aspect and can bulge into the central region 714 of the main valve bore 116. The precision-machined integral valve seat 250 can define a seating surface 910 that can seal with the valve member 140 (shown in FIG. 1), e.g., the valve plug, in the closed orientation. The seating surface 910 of the integral valve seat 250 can define a substantially arcuate or rounded cross-section in the present aspect. In other aspects, the integral valve seat 250 and the seating surface 910 thereof can define any other suitable shape, including more flat or angular shapes.

Thus, in example aspects, a method of manufacturing the valve body 110,610 can comprise providing the valve body 110,610 defining the inner body surface 112. The inner body surface 112 can define the main valve bore 116. The method can further comprise integrally forming the integral valve seat 250 with the valve body 110,610 by the hybrid manufacturing process. The hybrid manufacturing process can comprise depositing the additive material 410 onto the inner body surface 112 of the valve body 110,610, wherein the additive material 410 can form the integral valve seat 250, and machining the integral valve seat 250 to a desired size and shape. In some aspects, the steps of depositing the additive material 410 onto the inner body surface 112 and machining the integral valve seat 250 to a desired size and shape can be performed by the same machine, such as a CNC machine, for example and without limitation, without removing the valve body 110,610 from the machine.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of manufacturing a valve body, the method comprising:

providing the valve body defining an inner body surface, the inner body surface defining a main valve bore;

integrally forming an integral valve seat with the valve body by a hybrid manufacturing process, wherein the hybrid manufacturing process comprises:

depositing an additive material onto the inner body surface of the valve body, the additive material forming the integral valve seat; and machining the integral valve seat to a desired size and shape; and cutting a rough region onto the inner body surface prior to integrally forming the integral valve seat with the valve body, wherein:

the rough region is defined at a target location on the inner body surface;

the step of depositing the additive material onto the inner body surface of the valve body comprises depositing the additive material onto the inner body surface at the target location with a first machine;

the step of machining the integral valve seat is also performed by the first machine without removing the valve body from the first machine; and the step of cutting the rough region onto the inner body surface is also performed by the first machine and without removing the valve body from the first machine.

2. The method valve body assembly of claim 1, wherein the integral valve seat is a substantially annular integral valve seat extending about a circumference of the main valve bore.

3. The method valve body assembly of claim 2, wherein:

the valve body defines a shaft bore substantially perpendicular to the main valve bore;

the main valve bore defines an inlet region extending from a first end of the main valve bore towards the shaft bore and an outlet region extending from a second end of the main valve bore towards the shaft bore; and at least a portion of the integral valve seat is attached to the inner body surface at the inlet region.

4. The method valve body assembly of claim 3, wherein the integral valve seat comprises a first seat portion formed at the inlet region adjacent to the shaft bore and a second seat portion formed at the outlet region adjacent to the shaft bore.

5. The method valve body assembly of claim 3, wherein the main valve bore further defines a central region between the inlet region and the outlet region, the shaft bore is formed at the central region, and the integral valve seat is formed at the inlet region, proximate to the central region.

6. The method valve body assembly of claim 1, wherein the additive material comprises a metal material.

7. The method valve body assembly of claim 1, wherein the additive material comprises nickel.

* * * * *